United States Patent [19]

Minowa

[11] Patent Number: 4,775,869

[45] Date of Patent: Oct. 4, 1988

[54] THERMAL TRANSFER PRINTER INCLUDING SINGLE REVERSIBLE MOTOR FOR PRINTING

[75] Inventor: Masahiro Minowa, Nagano, Japan

[73] Assignee: Seiko Epson Corporation, Tokyo, Japan

[21] Appl. No.: 106,080

[22] Filed: Oct. 7, 1987

[30] Foreign Application Priority Data

Oct. 7, 1986 [JP] Japan ................................ 61-238271
Oct. 7, 1986 [JP] Japan ................................ 61-238272
Jun. 3, 1987 [JP] Japan ................................ 62-139294

[51] Int. Cl.[4] ................................ G01D 15/10

[52] U.S. Cl. ................................ 346/76 PH; 400/120; 400/225; 400/185; 400/59

[58] Field of Search ..................... 400/236.2, 225, 185, 400/59, 58, 229, 120 PH; 346/76 PH

[56] References Cited

U.S. PATENT DOCUMENTS 4,517,573 5/1985 Yana ................................ 400/120
4,553,861 11/1985 Lendl ................................ 400/120
4,651,165 3/1987 Shimada ................................ 400/120
4,653,939 3/1987 Hibino ................................ 400/120

FOREIGN PATENT DOCUMENTS 0053465 3/1983 Japan ................................ 400/59

OTHER PUBLICATIONS

U.S. Patent Application Serial No. 06/902,271.

*Primary Examiner*—Clifford C. Shaw
*Assistant Examiner*—Huan H. Tran
*Attorney, Agent, or Firm*—Blum Kaplan

[57] ABSTRACT

A thermal transfer printer having an ink ribbon winding mechanism and a heating element biasing mechanism driven by a single motor source is provided. A carriage is slideably mounted on a guide for reciprocating along a platen. A print head including a heating element is mounted on the carriage. An ink ribbon winding means for moving the ink ribbon across the heating element and a head displacing means for displacing the heating element towards the platen during printing and away from the platen when not printing are both mounted on the carriage. The motor is operatively coupled to the ink ribbon winding means and the print head displacing means.

17 Claims, 4 Drawing Sheets

THERMAL TRANSFER PRINTER INCLUDING SINGLE REVERSIBLE MOTOR FOR PRINTING

BACKGROUND OF THE INVENTION

This invention relates in general to a thermal transfer printer, and in particular, to a thermal transfer printer having a ribbon forwarding mechanism and a head biasing-releasing mechanism.

Thermal transfer printers are known in the art as disclosed in Japanese Patent Publication No. 21471/82. This prior art printer utilizes the driving force for moving the carriage carrying the thermal head separate to wind the ribbon. Another known thermal printer utilizes a separate motor for forwarding the ink ribbon. Typically, a solenoid plunger is utilized for biasing-releasing the thermal print head in thermal transfer printers.

These prior art mechanisms have been satisfactory; however, in the first device the carriage must move in order to use a desired color on a color ink ribbon, resulting in low speed printing. The second printer is expensive as two motors are required to drive the ink ribbon take-up and the thermal head. In both cases, noise and shock are generated by the solenoid plunger when used as the head biasing-releasing device. In view of this, noiseless printing which is desirable cannot be obtained. Additionally, where the ribbon take-up mechanism is actuated by a single driving source, the thermal head biasing-releasing driving mechanism must be controlled separately. This causes the construction of a driving control system to become complicated and results in increased costs.

Accordingly, it is desirable to provide a thermal transfer printer which overcomes the shortcomings of the prior art devices described above.

SUMMARY OF THE INVENTION

Generally speaking, in accordance with the invention, a thermal transfer printer having an improved head biasing and ink ribbon take-up system is provided. A carriage mounted opposed to a platen supports a rotating member capable of at least 360 degrees of rotation. A direction changer including the rotating member for changing rotational movement into reciprocating movement is also mounted on the carriage. A thermal head disposed opposite the platen is engaged by a head biasing-releasing mechanism having a resilient member engaged with the movement changer. The biasing-releasing mechanism urges the thermal head against the platen. A release engaging both the thermal head and the carriage biases the thermal head away from the platen after printing. A ribbon forwarding mechanism for forwarding a thermal transfer ink ribbon is mounted on the carriage. A motor selectively engages the biasing-releasing mechanism and the ribbon forwarding mechanism for selectively driving each respective mechanism.

It is an object of this invention to provide an improved thermal transfer printer.

Another object of this invention is to provide a thermal transfer printer capable of driving a ribbon forwarding mechanism and a thermal head biasing mechanism by a single motor.

A further object of the invention is to provide a substantially noiseless head biasing-releasing mechanism.

Still another object of the invention is to provide a serial type thermal transfer printer in which a slideably mounted carriage carrying a thermal print head includes a driving means capable of actuating a ribbon travelling mechanism independently of movement of the carriage.

Yet another object of the invention is to provide a thermal print head biasing mechanism which can select the optimum biasing force of the print head against the platen based upon a variety of printing conditions such as print mode and paper type.

Still other objects and advantages of the invention will in part be obvious and will in part be apparent from the specification and drawings.

The invention accordingly comprises features of construction, combination of elements, and arrangement of parts which will be exemplified in the construction hereafter set forth and the scope of the invention will be indicated in the claims.

BRIEF DESCRIPTION OF THE DRAWINGS

For a fuller understanding of the invention reference is had to the following description taken in connection with the accompanying drawings, in which.

DESCRIPTION OF THE PREFERRED EMBODIMENTS

Figure 2:
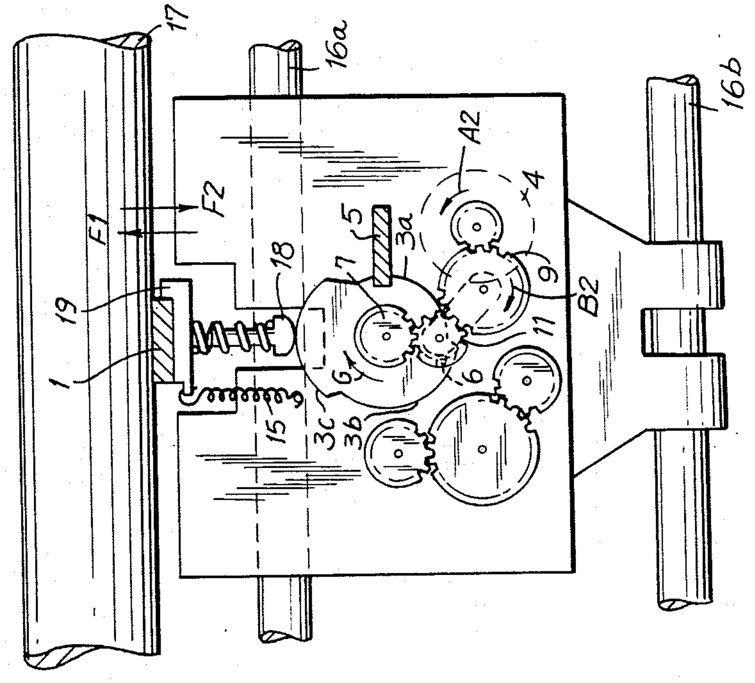
FIG. 2 is another top plan view in schematic showing the driving condition of the head biasing mechanism in the thermal printer of FIG. 1.

Reference is first made to FIGS. 1 to 4 in which the print head drive carriage for a thermal transfer printer constructed in accordance with the invention is shown.

A carriage frame 20 is slideably supported by guide shafts 16*a*, 16*b* for reciprocation in the directions of arrows E1 and E2. A shaft 21 is mounted within an opening 61 in carriage 20 and supports a radiating plate 19 which rotates about shaft 21 opposed to a platen 17. A thermal print head having a plurality of thermal elements 1 is affixed to plate 19 on the side facing platen 17.

A step motor 4 having a driven motor shaft 4*a* is mounted underneath carriage frame 20. A support arm 10 and a sun gear 9 are both rotatably mounted about a pin 31. A gear 8 is mounted on motor shaft 4*a* which passes through carriage frame 20. A sun gear 9 engages motor gear 8. A planet gear 11 is rotatably mounted about a shaft 31 which extends through support arm 10 and engages sun gear 9. A belleville spring 33 transmits the rotations of sun gear 9 to support arm 10 by urging planet gear 11 against support arm 10.

A second gear train including a first gear 12 and a second gear 13 is pivotably mounted on carriage 20 and positioned to engage each other. As will be described in greater detail below, gear 12 engages platen gear 11 and transmits rotations of planet gear 11 to gear 13 which in turn engages a gear 14 of the ribbon take-up mechanism 60 rotatably mounted on carriage 20.

Figure 1:
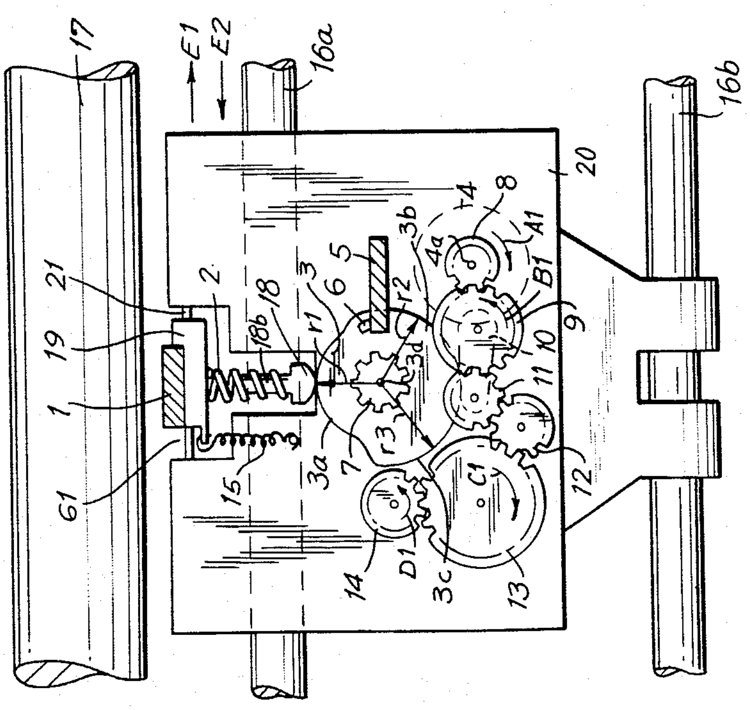
FIG. 1 is a top plan view of a thermal transfer printer constructed in accordance with the invention showing the ink ribbon take up mechanism engaged.
Figure 3:
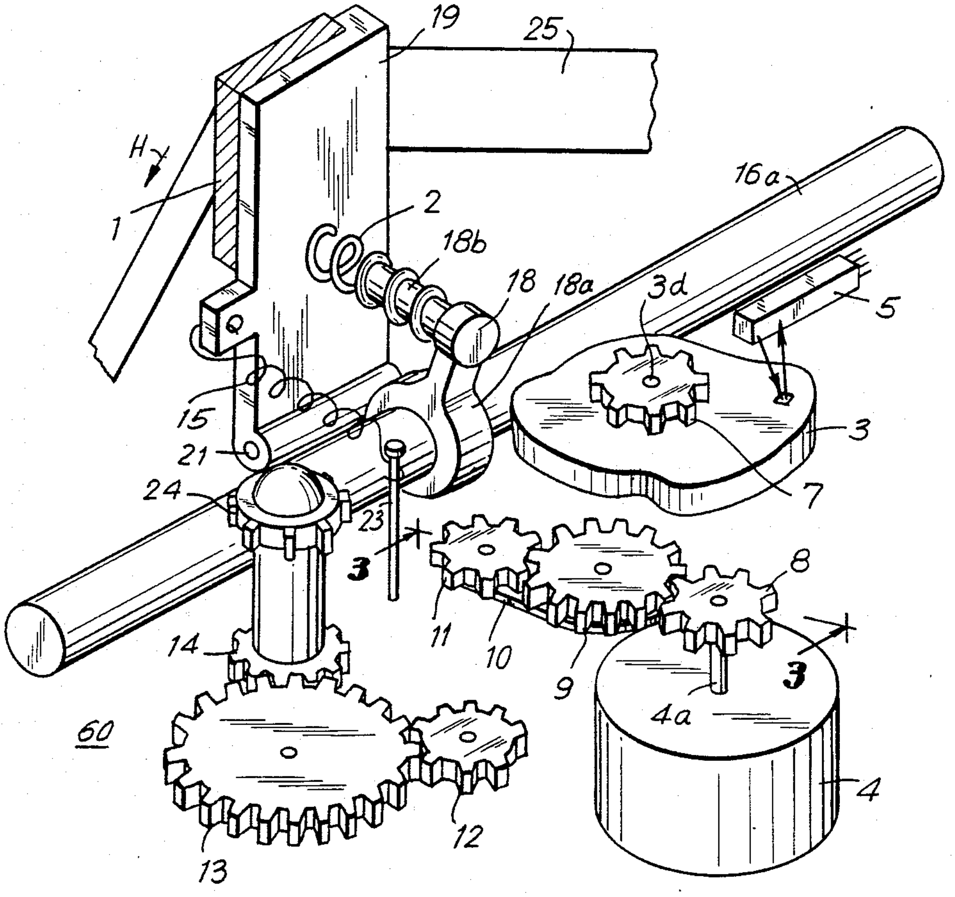
FIG. 3 is a perspective view of the thermal printer of FIG. 1 with the carriage not shown.
Figure 4:
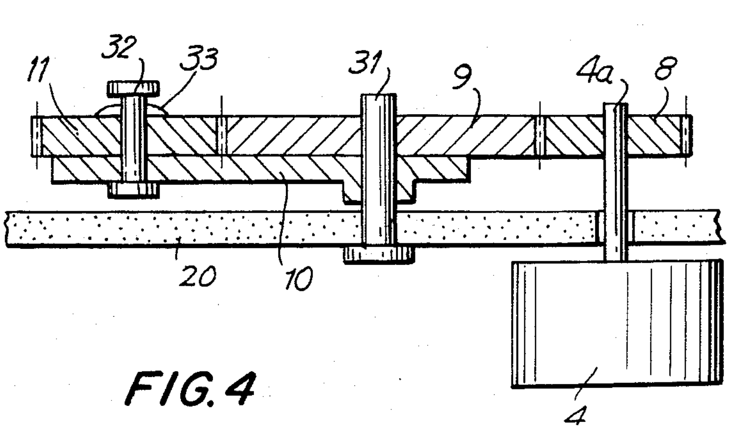
FIG. 4 is an enlarged cross-sectional view through line 3—3 of FIG. 3.

A cylindrical core 24 for taking up an ink ribbon 25 is fixedly mounted on gear 14 so as to rotate with gear 14. When planet gear 11 engages gear 12 ink ribbon take-up mechanism 60 is activated as shown in FIG. 1. Spring 33 urges planet gear 11 against support arm 10 and the rotation of gears 8, 9, and 11 causes support arm 10 to pivot about pin 31. When motor 4 rotates in a direction of arrow A1, sun gear 9 rotates in the direction of arrow B1 causing support arm 10 to rotate in a counter-clockwise direction which causes planet gear 11 to engage gear 12. Due to the rotation of gear 13 in a direction of arrow C1, take up spool gear 14 rotation of gear 13 in a of arrow D1, and ribbon 25 is taken up by a spool in an ink ribbon cassette (not shown). Additionally rotation of core 24 causes ink ribbon 24 to pass across thermal head 1. Gears 12, 13, 14 and core 24 constitute ink ribbon take-up mechanism 60.

A cam 3 capable of rotating through an angle of at least 360 degrees is mounted on a shaft **3*d* extending from carriage 20. Cam 3 has three regions each having a different radius. Cam 3 includes a first cam position 3*a* having a minimum radius r1, a second cam position 3*c* having a maximum radius r3 and a third cam position 3*b* having an intermediate radius r2. A reflective portion 6 is provided on the upper surface of cam 3, thereby providing a reference position which can be detected by a reflective type photo sensor 5 which constitute a cam position detector assembly. In a preferred embodiment, reflective portion 6 is location on cam position 3*a*** having radius r1.

A spring support member 18 integrally formed with a shaft support portion **18*a* is rotatably mounted about guide shaft 16*a*. Spring support member 18 is formed with an arm 18*c* which extends from support ring 18*a* and a spring support 18*b* extending towards radiating plate 19. Arm 18*c* is biased towards cam 3 by compression spring 2 mounted on spring support 18*b*. Thermal head 1 is displaced towards platen 17 in a direction of arrow F1 by selecting the position of cam 3. A tension spring 15 is fastened to plate 19 at its forward end and to a pin 23 anchored to carriage 20 at its rear end for biasing thermal head 1 towards carriage 20. When spring support arm 18*c* contacts cam 3 at cam position 3*a*, thermal head 1 moves in the direction of arrow F2 away from platen 17 due to the force of tension spring 15. At this time, ink ribbon 25 and the recording paper (not shown) can be inserted between thermal head 1 and platen 17. When spring support arm 18*c* contacts cam position 3*c* with maximum radius r3 while printing, the biasing force of thermal head 1 towards platen 17 is at its greatest. When arm 18*c* contacts cam position 3*b* the biasing force of head 1 towards platen 17 is at an intermediate level. The two later positions cause head 1 to move towards platen 17**.

FIG. 2 illustrates the position of elements in the head biasing/releasing action when driven by step motor 4. When step motor 4 is rotated in the direction of arrow A2, the opposite direction to that required in the ink ribbon take-up mode, sun gear 9 rotates in a direction of arrow B2. This rotates support arm 10 causing planet gear 11 to move in a clock-wise direction and engage a gear 7 integrally formed with cam 3 and shaft **3*d*, causing cam 3 to rotate in the direction of arrow G. The outer cam surface of rotating cam 3 has at least two radius in order to reciprocate support member 18 which follows the outer cam surface of cam 3. Cam 3 and spring support member 18** constitutes a print head movement direction changing assembly.

Spring support member 18 is so arranged that coil spring 2 is prevented from sliding from spring support **18*b*. It is preferable that coil spring 2 directly engage spring support member 18*b* at the end fixed to arm 18*c*. In another embodiment coil spring 2 directly engages the movement direction changing assembly to provide biasing force by which thermal head 1 is pressed against platen 17**. It should be noted that the different levels of biasing force are obtained by selection of the cam position.

It is known that the biasing force applied by a thermal head against the recording paper in a thermal transfer printer makes a difference in print density and in print quality. When rough bond paper or normal paper are used, a large biasing force is required for high print quality. On the other hand, when smooth thermal transfer paper is used, a small biasing force is required. Furthermore, when the biasing force is large the energy required to move the carriage loaded with a thermal head increases. Therefore, it is useful to change the biasing force to match the printing needs. The head biasing-releasing mechanism arranged in accordance with the invention is also suitable as a biasing force changing mechanism by selecting either cam position **3*b* or 3*c*** as needed.

When photosensor 5 detects reflective portion 6, the number of required steps of step motor 4 is determined using the reflective portion 6 as a reference position. Cam 3 can then be rotated to a predetermined cam position. Cam 3 as a rotating member is capable of rotation through an angle of at least 360 degrees in the direction of arrow G, so that all of the cam positions can be selected by one way rotation of motor 4. Therefore, a driving source for the head biasing-releasing mechanism can be used in common with other driving sources in the printer. Furthermore, the biasing and releasing of thermal head 1 can be achieved without a separate noise generating member, such as a plunger or the like.

Figure 5:
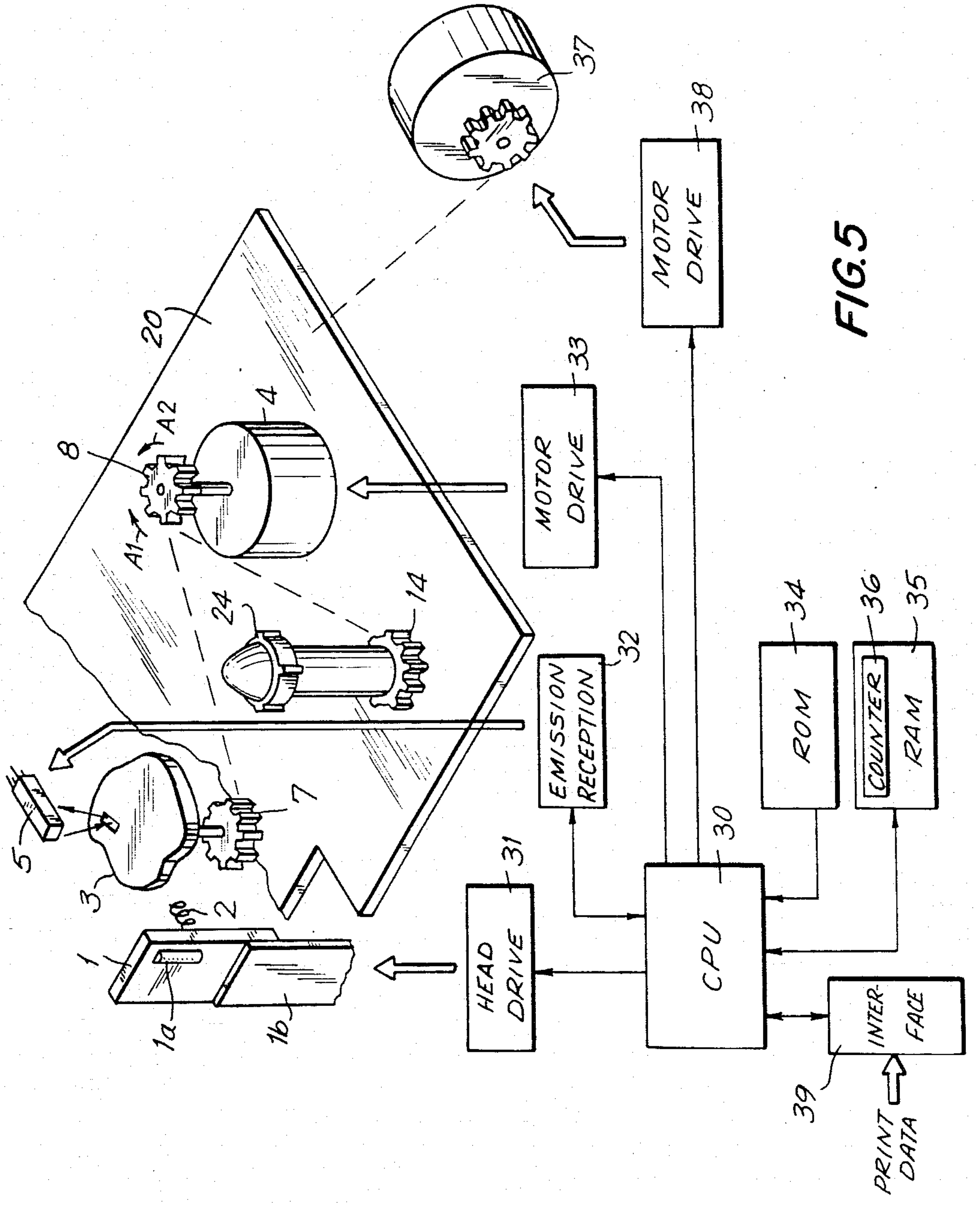
FIG. 5 is a schematic view showing the drive control circuitry for a thermal transfer printer constructed in accordance with the invention.

Reference is now also made to FIG. 5 in which the construction of a control for the thermal transfer printer is shown. The same reference numerals utilized in FIG. 1–4 are used. A CPU 30 is provided for controlling the thermal printer. A RAM 35 having a counter 36 for counting the number of steps of step motor 35 in response to input of print data by interface 39 to CPU 30. A ROM 34 stores the number of rotating steps from reference point 6 on cam 3 and inputs this data to CPU 30.

A heat resistance element **1*a* is disposed on the surface of thermal head 1, a flexible cable 1*b* acts as an electrode of thermal head 1 and receives input from a head driving circuit 31. An emission-reception circuit 32 receives input from reflective type photosensor 5 and CPU 30 as well as providing input to each. A first motor driving circuit 33 receives an input from CPU 30 and drives step motor 40 in reaction thereto. A carriage motor 37 which moves carriage frame 20 along platen 17 is controlled by a second motor driving circuit 38 which receives an input from CPU 30**.

When print data is input to CPU 30 from interface 39, the print mode is determined. At first, a first motor drive circuit 33 is actuated to rotate step motor 4 in a direction of arrow A2. The head biasing-releasing mechanism is selected and thermal head 1 is urged against platen 17 with a predetermined force. At this moment. cam 3 rotates through a predetermined rotating angle determined by CPU 30 via first motor drive circuit 33. The angle is such that the number of steps of step motor 4 stored in ROM 34 is the same value as counter 36 which is the number of steps from reference position 6 obtained from emission-reception circuit 32. Then, step motor 4 rotates in the direction of arrow A1 to stop the rotation of gear 8 thereby maintaining cam 3 in a selected position. Step motor 4 further rotates in the direction of arrow A1 thereby engaging motor 4 with ribbon take-up mechanism 60 to activate the ribbon take-up operation. Simultaneously, motor 37 is driven by second motor driving circuit 38 and printing is carried out by moving carriage frame 27 along platen 17 in the print direction. When the print operation is completed step motor 4 is rotated in the direction of arrow A1, and cam 3*a* having a minimum rotating radius is selected to move thermal head 1 away from platen 17. Then, the carriage is returned to the print staring position by driving carriage motor 37.

Core 24 includes a slipping mechanism to wind ink ribbon 25 without slack. In addition step motor 4 rotates at a high speed so that ink ribbon 25 is wound in a direction H at a speed faster than that at which ink ribbon 25 is fed, thereby keeping ink ribbon 25 taught.

In this embodiment, step motors are utilized as the driving sources of the head biasing-releasing mechanism and of the ink ribbon take-up mechanism. However, DC motors may be utilized if a rotation detector for detecting the rotating angle of cam 3 is used in conjunction with the motor. A photosensor has been used by way of example only and a mechanical switch may also be utilized as a detector. Additionally, a link mechanism may be substituted as the movement direction changing mechanism for changing rotational motion into reciprocating movement. Furthermore, power transmission need not be solely achieved by a sun and planet gear arrangement, but the directions of one of the motor rotations through a one way clutch both in the ink ribbon take-up mechanism and a rotating member or the like can be utilized as the power source.

Figure 6:
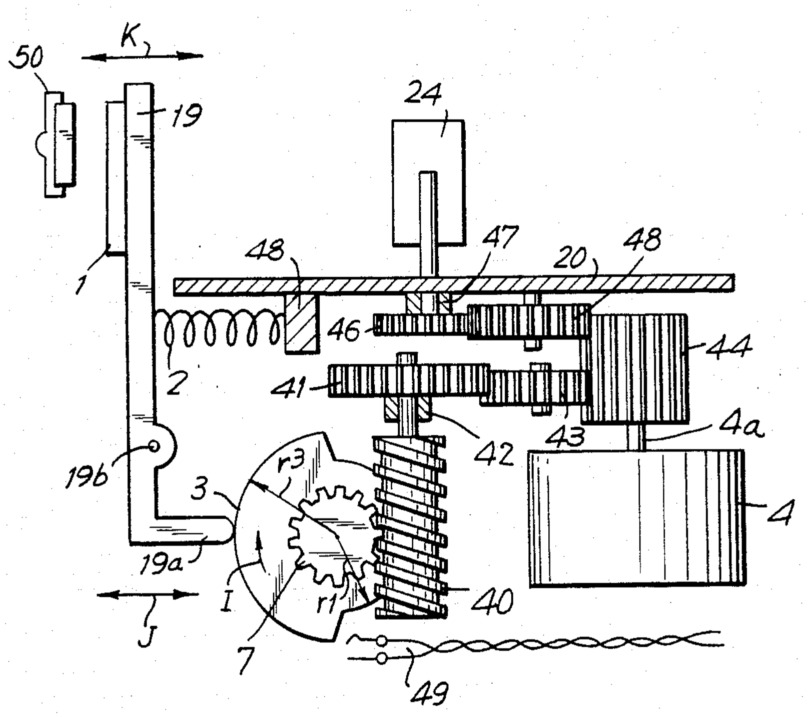
FIG. 6 is a side elevational view of another embodiment of a thermal transfer printer.

Reference is now made to FIG. 6 in which a second embodiment of the thermal printer is depicted in cross-section. Like parts are labeled with the same reference numerals as used in the embodiment of FIGS. 1–5.

A gear 44 mounted on shaft 4a of motor 4 engages a pair of transmission gears 43 and 45. Motor gear 44 also drives a second transmission gear 41. Gear 41 is mounted on a worm gear shaft 40*a* for rotating a worm gear 40 and a spring clutch 42 mounted on shaft 40*a*. Worm gear 40 engages cam gear 7 causing cam 3 to rotate in the direction of arrow I. Cam 3 abuts a projection 19*a* which is integrally formed with radiating plate 19 for converting the rotary motion of cam 3 into reciprocating movement of radiating projection 19*a* in the direction of arrow J. Radiating plate 19 is pivotably mounted on a pin 19*b*, allowing thermal head 1 to reciprocate around pin 19*b* as a rotating center. This moves thermal head 1 in the direction of arrow K.

A compression coil spring 2 supported between plate 19 and a support 48 of carriage 20 urges thermal head 1 against a platen 50 disposed opposite thermal head 1. Contrary to the embodiment shown in FIG. 1, thermal head 1 is urged against platen 50 when cam 3 is in the position of smallest radius $r_1$ and facing thermal head 1 and thermal head 1 is moved away from platen 50 when the largest radius r3 faces platen 50.

A mechanical switch 49 for detecting the position of cam 3 is turned on when radius r3 contacts switch 49 causing it to close. A driven gear 46 pivotably mounted below carriage frame 20 is driven by transmission gear 45 and transmits one way rotation thereof to ink ribbon take-up core 24 through a spring clutch 47. In this manner, a different rotational direction of motor 4 is transmitted to the ribbon forwarding mechanism then to the head biasing-releasing mechanism.

Figure 7:
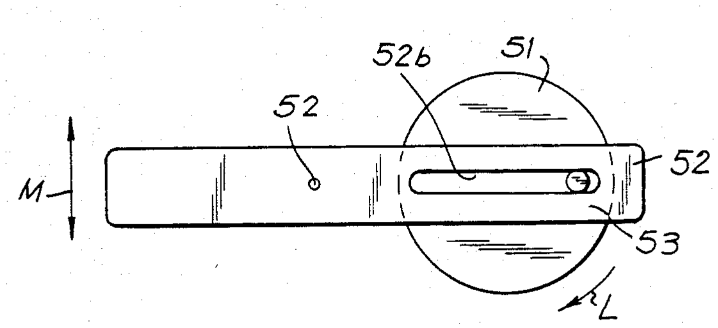
FIG. 7 is a side elevational view of an alternative embodiment of a movement direction changing mechanism for a thermal transfer printer constructed in accordance with the invention.

Reference is now also made to FIG. 7 wherein an embodiment of a link mechanism for changing the direction of movement is provided. A disk-shaped rotating member 51 having a projecting pin 53 is rotated in the direction of arrow L. Pin 53 is engaged in a groove 52*b* of an elongated lever 52 rotatably mounted on a pin 52*a* to produce reciprocating movement in the direction of arrow M around the center of a rotating center 52*a*. This movement can be utilized as a biasing-releasing movement of a thermal head.

The invention is not limited to these embodiments. Namely, the mechanisms constructed in accordance with the invention may also be utilized in an electro-thermal transfer printer wherein electrodes are utilized as heating elements. These electrodes apply an electric current to a resistive layer arranged on the back surface of a thermal transfer ribbon. Furthermore, this invention is suitable for use with a recycling ink ribbon, since the ink ribbon take-up mechanism may be modified as a ribbon travelling mechanism.

By providing a thermal transfer printer wherein the biasing-releasing of a head can be carried out by forward rotations of the motor, and the ink ribbon take-up by reverse rotations, a single drive source may be used. Thus, simple construction and low cost can be achieved in comparison with the prior art device wherein motors are provided for each of the respective operations. Furthermore, the ink ribbon can be taken up without carriage movements so that the head of the desired color of the color ink ribbon can be properly positioned in the stand-by condition before printing. Additionally, the ink ribbon can be taken up at the optional position in the sideways direction of the carriage. Thus, a thermal printer effective for high speed printing of a color ribbon is provided.

It will thus be seen that the objects set forth above, among those made apparent from the preceding description, are efficiently attained and since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention in which, as a matter of language, might be said to fall therebetween.

What is claimed is:

1. A thermal transfer printer wherein a heating element is pressed against a platen to transfer ink from an ink ribbon to a recording medium, comprising:
   - a guide;
   - a carriage, slideably mounted on the guide for transverse motion opposite the platen;
   - a print head including the heating element being mounted on the carriage;
   - a motor selectively rotatable in a first direction and a second opposite direction mounted on the carriage;

ink ribbon forwarding means driven by the motor for moving the ink ribbon across the heating element;
head displacing means including direction changing means for transforming the rotational motion of the motor into reciprocating motion for displacing the heating element towards the platen during printing and biasing the heating element away from the platen when printing is completed;
the direction changing means including a rotating member which is capable of at least 360 degrees of rotation; and
transmission means operatively coupled to the motor for engaging the ink ribbon forwarding means and the head biasing means, the transmission means including switching means for selectively engaging the ink ribbon forwarding means when the motor rotates in one direction and the head biasing means when the motor rotates in the opposite direction.

2. The thermal transfer printer of claim 1, wherein the switching means includes a support arm and a sun gear rotatably mounted on the carriage, a planet gear rotatably mounted on the support arm, the planet gear selectively operatively engaging the ink ribbon forwarding means or the head displacing means.

3. The thermal transfer printer of claim 1, wherein the ink ribbon forwarding means is an ink ribbon winding means, and includes a winding gear mounted on the carriage selectively engageable with the transmission means and a winding spool rotated by the winding gear.

4. The thermal transfer printer of claim 1, wherein the head displacing means includes a cam as the rotating member and a support member having a cam follower portion rotatably mounted for displacement towards the platen and away from the platen, the print head being mounted on the support member on the side opposite the cam follower portion, the rotatable cam mounted on the carriage, the cam follower biased towards and contacting the cam, the cam formed with at least a region of minimum radius and a region of maximum radius, whereby the heating element is biased away from the platen or towards the platen selectively.

5. The thermal transfer printer of claim 4, further including biasing force changing means for selectively providing intermediate levels of force for biasing the print head towards the platen.

6. The thermal transfer printer of claim 5, wherein the biasing force changing mechanism includes the cam being formed with at least one region of intermediate radius for biasing the print head towards the platen with less force than the region of maximum radius when the cam follower portion of the support member contacts the region of intermediate radius of the cam.

7. The thermal transfer printer of claim 3, wherein the transmission means comprises a motor gear rotatably mounted on the motor; a first transmission gear engaging the motor gear; a winding gear engaging the first gear, the ribbon winding means being rotated by the winding gear; a second transmission gear engaging the motor gear, a head displacing gear engaging the second transmission gear and head displacing gear for operating the head displacing means.

8. The thermal transfer printer of claim 7, wherein the head displacing means includes a support member having a cam follower portion rotatably mounted for displacement towards the platen and away from the platen, the print head being mounted on the support member on the side opposite the cam follower portion, a rotatable cam mounted on the carriage, the cam follower biased towards and contacting the cam, the cam formed with at least a region of minimum radius for biasing the support member and print head towards the platen in a region of maximum radius for displacing the print head away from the platen, whereby the heating element is biased away from the platen when the cam follower portion contacts the cam at a point of the maximum radius and towards the platen when the cam follower portion contacts the cam at a point of the minimum radius.

9. The thermal transfer printer of claim 4, further including detector means for determining the position of the rotatable cam.

10. The thermal transfer printer of claim 9, wherein the detector means includes a reflective surface fixed on a portion of the cam and a photo optical detector disposed to detect the presence of the reflective surface.

11. The thermal transfer printer of claim 9, wherein the detector means include a mechanical switch, the switch being selectively engaged with the maximum radius of the cam, whereby when the maximum radius of the cam contacts the switch, the switch is closed and when the switch is not in contact with the maximum radius of the cam the switch is opened, thereby indicating the position of the maximum radius.

12. A thermal transfer printer of claim 9, further including counting means for counting the rotation of the cam from the position of the cam detected by the detector means.

13. A thermal transfer printer of claim 12, wherein the counting means includes a CPU.

14. The thermal transfer printer of claim 1, wherein the head displacing means includes a disk shaped member rotatably mounted on the carriage, a pin mounted on the rotating member projecting therefrom, a lever having a groove therethrough rotatably mounted on the carriage, the pin engaging the groove, whereby rotation of the disk, shaped member causes resciprocal movement of the lever.

15. A thermal transfer printer wherein a heating element is pressed against a platen to transfer ink from an ink ribbon to a recording medium, comprising:
a guide;
a carriage, slideably mounted on the guide for transverse motion opposite the platen;
a print head including the heating element being mounted on the carriage;
a motor mounted on the carriage;
ink ribbon winding means for moving the ink ribbon across the print head including a winding gear mounted on the carriage and a winding spool rotated by the winding gear;
head displacing means for displacing the print head towards the platen during printing and biasing the print head away from the platen when printing is completed, including a support member having a cam follower portion rotatably mounted for displacement towards the platen and away from the platen, the print head being mounted on the support member, a rotatable cam mounted on the carriage, the cam follower biased towards and contacting the cam, the cam formed with at least a region of minimum radius for biasing the support member and print head away from the platen and a region of maximum radius for biasing the print head towards the platen, whereby the print head is biased away from the platen when the cam follower portion contacts the cam at a point of the minimum radius and towards the platen when the cam follower portion contacts the cam at a point of the maximum radius; and transmission means operatively coupled to the motor for engaging the ink ribbon winding means and the head displacing means.

16. A thermal transfer printer of claim 15, wherein the ink ribbon winding means is selectively engageable with the transmission means and the motor is selectively rotatable in two directions and wherein the transmission means includes switching means for engaging the ink ribbon winding means and the head displacing means, and includes switching means selectively operatively engageable with the ink ribbon winding means when the motor is rotated in a first direction and with the head displacing means when the motor is rotated in the opposite direction; the switching means includes a support arm rotatably mounted on the carriage, a sun and a platen gear rotatably mounted on the support arm, the planet gear selectively operatively engaging the ink ribbon winding means or the head displacing means.

17. A thermal printer wherein a heating element is pressed against a platen, comprising:

a guide;

a carriage, slideably mounted on the guide for transverse motion opposite the platen;

a print head including the heating element being mounted on the carriage;

a motor;

head displacing means including direction changing means for displacing the print head towards the platen during printing and biasing the heating element away from the platen when printing is completed;

the direction changing means including a rotating member which is capable of at least 360 degrees of rotation by the motor; and biasing force changing means including the rotating member for changing biasing force of the head against the platen by selecting position of the rotating member.

* * * * *